US012739722B2

(12) United States Patent
Wegmann et al.

(10) Patent No.: US 12,739,722 B2
(45) Date of Patent: Sep. 15, 2026

(54) METHODS AND APPARATUSES RELATING TO WIRELESS COMMUNICATION

(71) Applicant: Nokia Technologies Oy, Espoo (FI)

(72) Inventors: Bernhard Wegmann, Munich (DE); Ahmad Awada, Munich (DE); Irina-Mihaela Balan, Munich (DE); Ugur Baran Elmali, Munich (DE); Guillaume Decarreau, Munich (DE)

(73) Assignee: Nokia Technologies Oy, Espoo, FL (US)

( * ) Notice: Subject to any disclaimer, the term of this patent is extended or adjusted under 35 U.S.C. 154(b) by 296 days.

(21) Appl. No.: 18/421,159

(22) Filed: Jan. 24, 2024

(65) Prior Publication Data

US 2024/0276337 A1 Aug. 15, 2024

(30) Foreign Application Priority Data

Feb. 10, 2023 (GB) ..................................... 2301922

(51) Int. Cl.
*H04W 36/30* (2009.01)
*H04W 36/00* (2009.01)

(52) U.S. Cl.
CPC ..... *H04W 36/305* (2018.08); *H04W 36/0058* (2018.08)

(58) Field of Classification Search
CPC ........... H04W 36/305; H04W 36/0058; H04W 24/02; H04W 36/0085; H04W 36/362
See application file for complete search history.

(56) References Cited

U.S. PATENT DOCUMENTS

| | | | |
|---|---|---|---|
| 9,258,747 B2 | 2/2016 | Sivanesan et al. | |
| 2015/0237516 A1* | 8/2015 | Michel ................. | H04W 24/10 370/252 |
| 2021/0058834 A1 | 2/2021 | Paladugu et al. | |

(Continued)

FOREIGN PATENT DOCUMENTS

| | | |
|---|---|---|
| WO | 2020/167237 A1 | 8/2020 |
| WO | 2021/063487 A1 | 4/2021 |
| WO | 2022/051900 A1 | 3/2022 |
| WO | 2022/086381 A1 | 4/2022 |
| WO | 2022/141563 A1 | 7/2022 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

(Continued)

*Primary Examiner* — Christopher M Brandt
(74) *Attorney, Agent, or Firm* — Lippes Mathias LLP

(57) ABSTRACT

This specification describes a terminal device comprising: means for establishing a radio communications link between the terminal device and a serving cell of a telecommunications network; means for executing a transfer of the radio communications link from the serving cell to a target cell of the telecommunications network; means for detecting that a timer, expiry of which causes declaration of a radio link failure with the serving cell, has reached a threshold value but has been stopped prior to expiry and prior to execution of the transfer; and means for, after successful execution of the transfer, controlling the transmission or the content of a transfer report based on the detecting.

20 Claims, 7 Drawing Sheets

(56) References Cited

U.S. PATENT DOCUMENTS

2022/0141725 A1* 5/2022 Parichehrehteroujeni .................. H04W 36/00837 370/331
2022/0394585 A1 12/2022 Kim
2023/0300655 A1* 9/2023 Thangarasa ......... H04W 36/302 370/329
2024/0323711 A1* 9/2024 Li .......................... H04B 17/17
2024/0406811 A1* 12/2024 Zhang ................... H04W 36/04

OTHER PUBLICATIONS

"5G; NR, Requirements for support of radio resource management (3GPP TS 38.133 version 17.7.0 Release 17)", ETSI TS 138 133, V17.7.0, Oct. 2022, 3823 pages.
"Msc-generator", Sourceforge, Retrieved on Dec. 21, 2023, Webpage available at : https://sourceforge.net/projects/msc-generator/.
"Report of [Post114-e][851 [SONMDT] Procedures and Modeling of successful HO report (Huawei)", 3GPP TSG RAN2 #115-e, R2-21xxxxx, Agenda: R17 Son, Huawei, Aug. 16-27, 2021, pp. 1-12.
Search Report received for corresponding United Kingdom Patent Application No. 2301922.7, dated Jul. 27, 2023, 2 pages.
Extended European Search Report received for corresponding European Patent Application No. 23215470.8, dated Jun. 11, 2024, 10 pages.
"SPR and SHR generation and reporting", 3GPP TSG-RAN WG2 #121, R2-2301003, Agenda: 8.13.4, Nokia, Feb. 27-Mar. 3, 2023, 4 pages.

* cited by examiner

300
Event
301
302
304
305
306
t
303
310
Q
t
$Q_{in}$
$Q_{out}$

METHODS AND APPARATUSES RELATING TO WIRELESS COMMUNICATION

RELATED APPLICATION

This application claims priority from GB Application No. 2301922.7, filed on Feb. 10, 2023, which is incorporated herein by reference in its entirety.

FIELD

This specification relates generally to wireless communication.

BACKGROUND

Terminal devices, sometimes referred to as 'user equipment' (UE) devices, can communicate wirelessly with radio access nodes (e.g. base stations). Such communication may facilitate a variety of tasks.

SUMMARY

In a first aspect, this specification describes a terminal device comprising means for establishing a radio communications link between the terminal device and a serving cell of a telecommunications network; means for executing a transfer of the radio communications link from the serving cell to a target cell of the telecommunications network; means for detecting that a timer, expiry of which causes declaration of a radio link failure with the serving cell, has reached a threshold value but has been stopped prior to expiry and prior to execution of the transfer; and means for, after successful execution of the transfer, controlling the transmission or the content of a transfer report based on the detecting.

In some examples, controlling the content of the transfer report based on the detecting may comprise controlling the content of the transfer report to include an indication that the timer was stopped prior to expiry of the timer and prior to execution of the transfer. In other examples, controlling the transmission of the transfer report based on the detecting may comprise refraining from transmitting the transfer report.

In some examples, the timer may be started responsive to a detection of a deterioration in signal quality of the radio communications link between the terminal device and the serving cell. In some such examples, the deterioration in signal quality of the radio communications link between the terminal device and the serving cell may comprise a signal quality metric for the radio communications link between the terminal device and the serving cell falling below a quality deterioration threshold.

The timer may be stopped responsive to a detection of an improvement in signal quality of the radio communications link between the terminal device and the serving cell subsequent to the timer reaching the threshold value. In some such examples, the improvement in signal quality of the radio communications link between the terminal device and the serving cell may comprise a signal quality metric for the radio communications link between the terminal device and the serving cell meeting or exceeding a quality improvement threshold.

The transfer report may include information indicative of measurements relating to the transfer of the radio communications link from the serving cell to the target cell. In some such examples, compilation of the measurements may be initiated at the terminal device responsive to the timer reaching the threshold value. In addition or alternatively, the measurements relating to the transfer of the radio communications link may be performed by the terminal device during a time interval between (i) a configuration of the terminal device for the transfer of the radio communications link and (ii) an execution of the transfer of the radio communications link. In addition or alternatively, the measurements relating to the transfer of the radio communications link may comprise at least one of: measurements of signals received at the terminal device from the serving cell; measurements of signals received at the terminal device from the target cell; or measurements of signals received at the terminal device from a neighbouring cell of the telecommunication network.

The transfer report may further include outage timing information for at least one temporary deterioration in signal quality of the radio communications link between the terminal device and the serving cell. In some such examples, the outage timing information for the at least one temporary deterioration in signal quality may comprise at least one of: a time interval between (i) a configuration of the terminal device for the transfer of the radio communications link and (ii) a starting of the timer; a time interval between (i) a starting of the timer and (ii) a stopping of the timer; a time interval between (i) a stopping of the timer and (ii) the execution of the transfer of the radio communications link; or a time interval between (i) a starting of the timer and (ii) the execution of the transfer of the radio communications link. In addition or alternatively, the outage timing information for the at least one temporary deterioration in signal quality may comprise at least one of: a number of the at least one temporary deterioration in signal quality; a time interval between (i) a configuration of the terminal device for the transfer of the radio communications link and (ii) a first starting of the timer; a time interval between (i) a last stopping of the timer and (ii) the execution of the transfer of the radio communications link; or a time interval between (i) a last starting of the timer and (ii) the execution of the transfer of the radio communications link.

The terminal device may be preconfigured to autonomously trigger execution of the transfer based on configuration information received from the serving cell via the radio communications link. In some such examples, the configuration information may be indicative of at least one condition, and the transfer is executed responsive to the at least one condition being fulfilled.

In a second aspect, this specification describes a radio access node comprising: means for transmitting or receiving a transfer report relating to a transfer, from a serving cell of a telecommunications network to a target cell of the telecommunications network, of a radio communications link involving a terminal device, the transfer report including an indication that a timer, expiry of which causes declaration, by the terminal device, of a radio link failure with the serving cell, has reached a threshold value but has been stopped prior to expiry and prior to execution of the transfer.

In a third aspect, this specification describes a method comprising establishing a radio communications link between the terminal device and a serving cell of a telecommunications network; executing a transfer of the radio communications link from the serving cell to a target cell of the telecommunications network; detecting that a timer, expiry of which causes declaration of a radio link failure with the serving cell, has reached a threshold value but has been stopped prior to expiry and prior to execution of the transfer; and, after successful execution of the transfer, controlling the transmission or the content of a transfer report based on the detecting.

In some examples, controlling the content of the transfer report based on the detecting may comprise controlling the content of the transfer report to include an indication that the timer was stopped prior to expiry of the timer and prior to execution of the transfer. In other examples, controlling the transmission of the transfer report based on the detecting may comprise refraining from transmitting the transfer report.

In some examples, the timer may be started responsive to a detection of a deterioration in signal quality of the radio communications link between the terminal device and the serving cell. In some such examples, the deterioration in signal quality of the radio communications link between the terminal device and the serving cell may comprise a signal quality metric for the radio communications link between the terminal device and the serving cell falling below a quality deterioration threshold.

The timer may be stopped responsive to a detection of an improvement in signal quality of the radio communications link between the terminal device and the serving cell subsequent to the timer reaching the threshold value. In some such examples, the improvement in signal quality of the radio communications link between the terminal device and the serving cell may comprise a signal quality metric for the radio communications link between the terminal device and the serving cell meeting or exceeding a quality improvement threshold.

The transfer report may include information indicative of measurements relating to the transfer of the radio communications link from the serving cell to the target cell. In some such examples, compilation of the measurements may be initiated at the terminal device responsive to the timer reaching the threshold value. In addition or alternatively, the measurements relating to the transfer of the radio communications link may be performed by the terminal device during a time interval between (i) a configuration of the terminal device for the transfer of the radio communications link and (ii) an execution of the transfer of the radio communications link. In addition or alternatively, the measurements relating to the transfer of the radio communications link may comprise at least one of: measurements of signals received at the terminal device from the serving cell; measurements of signals received at the terminal device from the target cell; or measurements of signals received at the terminal device from a neighbouring cell of the telecommunication network.

The transfer report may further include outage timing information for at least one temporary deterioration in signal quality of the radio communications link between the terminal device and the serving cell. In some such examples, the outage timing information for the at least one temporary deterioration in signal quality may comprise at least one of: a time interval between (i) a configuration of the terminal device for the transfer of the radio communications link and (ii) a starting of the timer; a time interval between (i) a starting of the timer and (ii) a stopping of the timer; a time interval between (i) a stopping of the timer and (ii) the execution of the transfer of the radio communications link; or a time interval between (i) a starting of the timer and (ii) the execution of the transfer of the radio communications link. In addition or alternatively, the outage timing information for the at least one temporary deterioration in signal quality may comprise at least one of: a number of the at least one temporary deterioration in signal quality; a time interval between (i) a configuration of the terminal device for the transfer of the radio communications link and (ii) a first starting of the timer; a time interval between (i) a last stopping of the timer and (ii) the execution of the transfer of the radio communications link; or a time interval between (i) a last starting of the timer and (ii) the execution of the transfer of the radio communications link.

In a fourth aspect, this specification describes a method comprising transmitting or receiving a transfer report relating to a transfer, from a serving cell of a telecommunications network to a target cell of the telecommunications network, of a radio communications link involving a terminal device, the transfer report including an indication that a timer, expiry of which causes declaration, by the terminal device, of a radio link failure with the serving cell, has reached a threshold value but has been stopped prior to expiry and prior to execution of the transfer.

In a fifth aspect, this specification describes apparatus (e.g. a terminal device or a component of a terminal device) comprising at least one processor and at least one memory storing instructions that, when executed by the at least one processor, cause the apparatus at least to perform: establishing a radio communications link between the terminal device and a serving cell of a telecommunications network; executing a transfer of the radio communications link from the serving cell to a target cell of the telecommunications network; detecting that a timer, expiry of which causes declaration of a radio link failure with the serving cell, has reached a threshold value but has been stopped prior to expiry and prior to execution of the transfer; and, after successful execution of the transfer, controlling the transmission or the content of a transfer report based on the detecting.

In some examples, controlling the content of the transfer report based on the detecting may comprise controlling the content of the transfer report to include an indication that the timer was stopped prior to expiry of the timer and prior to execution of the transfer. In other examples, controlling the transmission of the transfer report based on the detecting may comprise refraining from transmitting the transfer report.

In some examples, the timer may be started responsive to a detection of a deterioration in signal quality of the radio communications link between the terminal device and the serving cell. In some such examples, the deterioration in signal quality of the radio communications link between the terminal device and the serving cell may comprise a signal quality metric for the radio communications link between the terminal device and the serving cell falling below a quality deterioration threshold.

The timer may be stopped responsive to a detection of an improvement in signal quality of the radio communications link between the terminal device and the serving cell subsequent to the timer reaching the threshold value. In some such examples, the improvement in signal quality of the radio communications link between the terminal device and the serving cell may comprise a signal quality metric for the radio communications link between the terminal device and the serving cell meeting or exceeding a quality improvement threshold.

The transfer report may include information indicative of measurements relating to the transfer of the radio communications link from the serving cell to the target cell. In some such examples, compilation of the measurements may be initiated at the terminal device responsive to the timer reaching the threshold value. In addition or alternatively, the measurements relating to the transfer of the radio communications link may be performed by the terminal device during a time interval between (i) a configuration of the terminal device for the transfer of the radio communications link and (ii) an execution of the transfer of the radio communications link. In addition or alternatively, the measurements relating to the transfer of the radio communications link may comprise at least one of: measurements of signals received at the terminal device from the serving cell; measurements of signals received at the terminal device from the target cell; or measurements of signals received at the terminal device from a neighbouring cell of the telecommunication network.

The transfer report may further include outage timing information for at least one temporary deterioration in signal quality of the radio communications link between the terminal device and the serving cell. In some such examples, the outage timing information for the at least one temporary deterioration in signal quality may comprise at least one of: a time interval between (i) a configuration of the terminal device for the transfer of the radio communications link and (ii) a starting of the timer; a time interval between (i) a starting of the timer and (ii) a stopping of the timer; a time interval between (i) a stopping of the timer and (ii) the execution of the transfer of the radio communications link; or a time interval between (i) a starting of the timer and (ii) the execution of the transfer of the radio communications link. In addition or alternatively, the outage timing information for the at least one temporary deterioration in signal quality may comprise at least one of: a number of the at least one temporary deterioration in signal quality; a time interval between (i) a configuration of the terminal device for the transfer of the radio communications link and (ii) a first starting of the timer; a time interval between (i) a last stopping of the timer and (ii) the execution of the transfer of the radio communications link; or a time interval between (i) a last starting of the timer and (ii) the execution of the transfer of the radio communications link.

In a sixth aspect, this specification describes apparatus (e.g. a radio access node or a component of a radio access node) comprising at least one processor and at least one memory storing instructions that, when executed by the at least one processor, cause the apparatus at least to perform: transmitting or receiving a transfer report relating to a transfer, from a serving cell of a telecommunications network to a target cell of the telecommunications network, of a radio communications link involving a terminal device, the transfer report including an indication that a timer, expiry of which causes declaration, by the terminal device, of a radio link failure with the serving cell, has reached a threshold value but has been stopped prior to expiry and prior to execution of the transfer.

In a seventh aspect, this specification describes a non-transitory computer readable medium comprising program instructions stored thereon for causing performance of any of the methods described with reference to the third or fourth aspects.

BRIEF DESCRIPTION OF THE FIGURES

For better understanding of the present application, reference will now be made by way of example to the accompanying drawings in which.

DETAILED DESCRIPTION

Figure 1:
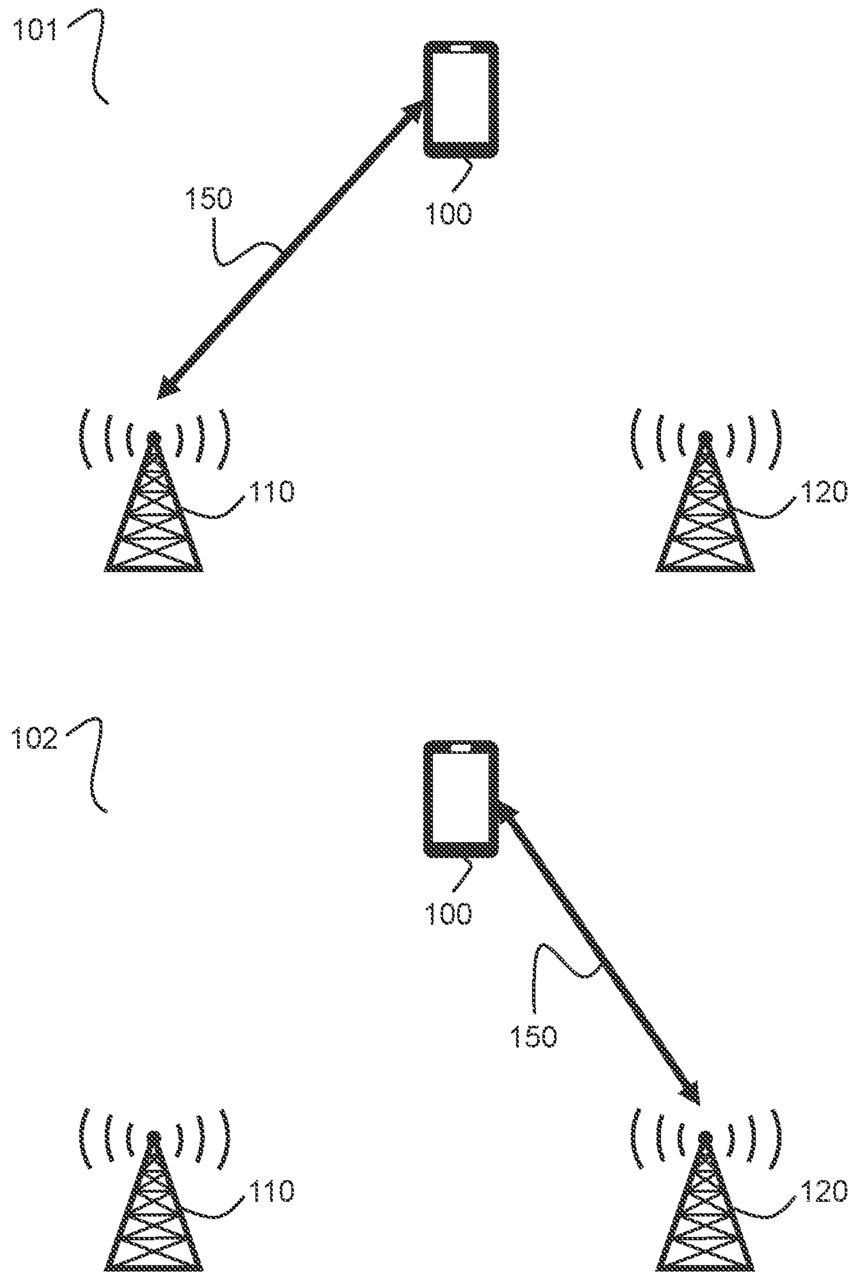
FIG. 1 is an example illustrating transfer of a communications link involving a terminal device from a source cell to a target cell.

In the description and drawings below, like reference numerals refer to like elements throughout.

It may be beneficial for communication links involving terminal devices, such as UE devices, to be transferred between telecommunications network cells.

Transfer of communication links involving a terminal device may be performed by switching a communications link from a first telecommunications network cell, referred to as the serving cell or source cell, to a second telecommunications network cell, referred to as the target cell. Such transfer of communication links involving terminal devices between cells may be referred to as 'inter-cell' transfer.

Communications links involving terminal devices may be transferred between cells so as to avoid disruption when the terminal device moves out of a geographic area covered by the source cell and into a geographic area covered by the target cell, to reduce or eliminate interference with other terminal devices connected to neighbouring cells using the same channel, or to free up capacity in the source cell for other users. Various other situations in which it may be beneficial to transfer communication links between telecommunications network cells will be apparent to the skilled person.

In general terms, inter-cell transfer may enable an ongoing communications session between a terminal device and the network to be transferred from one channel connected to the core network (CN) to another channel. During such a transfer, the communications session may be maintained with no or minimal disruption.

Implementations of the technology described herein relate to establishing a radio communications link between the terminal device and a serving cell of a telecommunications network; executing a transfer of the radio communications link from the serving cell to a target cell of the telecommunications network; detecting that a timer, expiry of which causes declaration of a radio link failure with the serving cell, has reached a threshold value but has been stopped prior to expiry and prior to execution of the transfer; and after successful execution of the transfer, controlling the transmission or the content of a transfer report based on the detecting.

For instance, by controlling the transmission or the content of a transfer report, various implementations of the technology described herein may prevent information included in the transfer report (e.g. information indicative of measurements relating to the transfer) from being used for adjusting transfer parameters for use in determining inter-cell transfers within the telecommunications network. Some example aspects described herein relate to transmitting a transfer report including an indication that a timer, expiry of which causes declaration of a radio link failure with the serving cell, has reached a threshold value but has been stopped prior to expiry and prior to execution of the transfer. Other example aspects relate to initiating preparation of a transfer report for transmission and subsequently refraining from transmitting the transfer report, such that information included in the transfer report is not used for adjusting transfer parameters for use in determining inter-cell transfers within the telecommunications network.

As described in detail below with reference to FIGS. 1 and 4, various implementations of the technology described herein may allow for a reduction in radio link failures (RLFs) and/or unnecessary transfers of communications links between nodes caused by incorrect transfer parameter settings. For instance, by ensuring that communications link transfers which occurred under stable radio link conditions of the serving cell are not wrongly interpreted and classified as executing 'almost too late', unnecessary communication link transfers may be prevented.

In some examples, the term 'terminal device' or 'user equipment' may refer to any device employed by a user to communicate. Whilst the terminal device of FIG. 1 is depicted as a mobile telephone, it will of course be appreciated that terminal devices may comprise various other devices, including, but not limited to laptops, smartwatches, tablet computers and vehicle-based terminal devices, such as those mounted on cars, buses, uncrewed aerial vehicles (UAVs), aeroplanes, trains, or boats. Alternatively, mobile terminal devices may be carried by a user, or worn on their person.

Various methods and apparatuses are described in detail below, by way of example only, in the context of a cellular network, such as an Evolved Universal Terrestrial Radio Access (E-UTRA) network or a 5G network. However, it will be appreciated that the techniques may be applicable with communications networks of other types (e.g. but not limited to other types of cellular network). Cellular networks may comprise one or more base stations, sometimes referred to as transmit-receive points (TRPs), radio access nodes, or access points (e.g. but not limited to gNBs and/or eNBs). Whilst only two base stations are depicted in FIG. 1, a radio access network (RAN, NG-5 RAN) may typically comprise thousands of such base stations. Together, the base stations may provide cellular network coverage to one or more terminal devices over a wide geographical area.

Although by no means limited to such an implementation, the examples of the technology described herein may readily be integrated into any New Radio (NR) terminal device which performs Conditional Handover (CHO) or Conditional PSCell Change (CPC) as specified in 3GPP Release 16. In particular, various aspects of the technology described herein may be applicable to Successful Handover Reports (SHR) as described in TS 38.331 and Successful PSCell Reports (SPR), which are expected to be specified in 3GPP Release 18.

In some implementations and, for instance, depending on the characteristics of the cellular network, the base stations and terminal devices within the network may be configured to communicate with one another, for instance, using an OFDM-based communication scheme, such as orthogonal frequency-division multiple access (OFDMA), single carrier frequency-division multiple access (SC-FDMA), and/or cyclic prefix orthogonal frequency-division multiple access (CP-OFDMA). For instance, in some non-limiting examples, OFDMA may be used for downlink (DL) communications and SC-FDMA may be used for uplink (UL) communications.

FIG. 1 depicts a terminal device 100 together with base stations 110 and 120. In this example, base station 110 serves a source telecommunications network cell and base station 120 serves a target telecommunications network cell.

In general terms, FIG. 1 relates to a situation in which a radio communications link of terminal device 100 is transferred from the source telecommunications network cell to the target telecommunications network cell. In particular, at a first time 101, a radio communications link 150 is depicted between terminal device 100 and the source cell operated by base station 110. At a second time 102, after radio communications link 150 has been transferred from the source cell to the target cell, radio communications link 150 is depicted between terminal device 100 and the target cell operated by base station 120.

In some examples, such as those in which the source cell and the target cell are included in a master cell group (MCG), the transfer of the radio communications link from the source cell to the target cell may be referred to as a handover (HO). Where the terminal device is pre-configured (e.g. based on a signal received from the network via the serving cell) to autonomously transfer (i.e., without a handover command) the radio communications link upon fulfilment of one or more transfer conditions, the transfer may be referred to as a conditional handover (CHO).

In other examples, such as those in which the source cell and the target cell are included in a secondary cell group (SCG) (e.g. in a multi-radio dual connectivity, MR-DC, scenario), the transfer of the radio communications link from the source cell to the target cell may be referred to as a PSCell change. Likewise, where the terminal device is pre-configured to autonomously transfer the radio communications link upon fulfilment of one or more transfer conditions, the transfer may be referred to as a conditional PSCell change (CPC).

Whilst various aspects of the technology disclosed herein are described in the context of CHO, it will be appreciated that such aspects may be applied in the context of CPC and/or other transfers of radio communications links between cells. In general, where the terminal device is pre-configured to autonomously transfer the radio communications link upon fulfilment of one or more transfer conditions, the transfer may be referred to as a conditional transfer.

After successful execution of a transfer, it may be beneficial to provide the network (e.g. via a base station) with a transfer report. For instance, a transfer report may include information relating to the transfer of radio communications link 150 from the source cell to the target cell, such as information indicative of measurements relating to the transfer. In some examples in which the transfer is a CHO, the information may be provided as a successful HO report (SHR). In some examples in which the transfer is a CPC, the information may be provided as a successful PSCell change report (SPR).

In this way, the network may be provided with additional information about detected deteriorations in signal quality of the radio communications link between the terminal device and the source cell during the transfer process, even if the handover was ultimately completed successfully. For instance, such information may be indicative of temporary outage issues experienced by the terminal device in the time interval between a configuration of the terminal device for the transfer of the radio communications link and an execution of the transfer of the radio communications link.

In some examples, the information relating to the transfer may be used to adjust transfer parameters for use in determining inter-cell transfers within the telecommunications network (e.g. by performing mobility robustness optimisation, MRO). However, as described above, radio communications link transfers which occurred under stable radio link conditions of the serving cell may be wrongly interpreted and classified as executing 'almost too late'. In this case, adjusting the transfer parameters based on the information relating to the transfer may cause the transfer parameters to be improperly configured, resulting in unnecessary or even disadvantageous inter-cell transfers within the network. In some examples, such improperly configured transfer parameters may even lead to occurrence of radio link failures at terminal devices within the network.

Figures 2, 3:
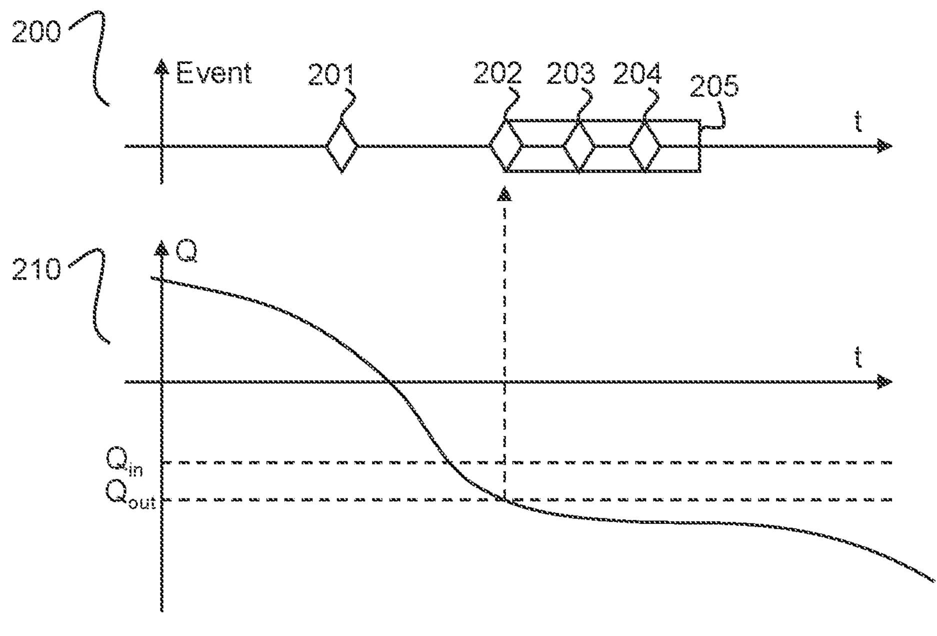
FIGS. 2 and 3 are graphs illustrating deterioration in signal quality that may occur when transferring a communication link between cells.

By way of example only, FIGS. 2 and 3 depict SINR quality measurements relating to a conditional handover process, but could be equally applicable to other signal metrics, such as RSRP or RSRQ.

In the graph of FIG. 2, the upper axes 200 chart various events that occur during a handover process and the lower axes 210 display a signal quality, Q, of the radio communications link between a terminal device and serving cell against time. At time 201, the terminal device is configured for CHO, entering an 'evaluation phase' in which the transfer condition is repeatedly evaluated. At time 202, a deterioration in signal quality of the radio communication link is detected. In particular, the signal quality Q falls below a signal deterioration threshold, $Q_{out}$. This triggers out-of-sync indications from lower layers in the network and starts the radio link monitoring (RLM) timer T310, expiry of which causes declaration of a radio link failure (RLF) with the serving cell. At time 203, when the timer has run for a predetermined duration (e.g. 40% of the timer's total duration before expiry at time 205), the terminal device is configured to compile a SHR. In some examples, the timer running for a predetermined duration may be referred to as passing the thresholdPercentageT310 criterion.

In this case, having determined that the transfer condition is fulfilled, the CHO is successfully executed at time 204 whilst timer T310 is still running, prior to the timer's expiry at time 205. Although the CHO was successfully executed, this is an example of an 'almost too late execution', and so the SHR is compiled to provide information which can be used to refine transfer parameters of the network (e.g. as part of an MRO process).

On the other hand, the graph of FIG. 3 relates to the situation in which stable radio link conditions return prior to the execution of the handover. In this example, axes 300 and 310 correspond to axes 200 and 210 of FIG. 2, and the events occurring at times 301 to 303 substantially correspond to the events occurring at times 201 to 203 in the example of FIG. 2. However, in this example, an improvement in signal quality of the radio communications link may be detected at time 304, that is after compilation of the SHR was triggered at time 303. In particular, the improvement in signal quality may correspond to the signal quality meeting or exceeding a signal improvement threshold, $Q_{in}$. This causes the RLF timer T310 to stop at time 304 before both expiry of the timer at time 305 and execution of the CHO at time 306.

In this example, the temporary outage of the radio signal of the serving cell, during the time window between T310 being started and stopped, could have been caused by shadowing and/or interference. Given that the radio signal quality of the serving cell recovered in-sync after compilation of the SHR was triggered at time 303, the CHO execution was not jeopardized. Put another way, at the moment of CHO execution, the terminal device was experiencing stable radio link conditions and so the handover should not be considered to be 'risky' or 'almost too late'.

However, the compiled SHR indicating an outage shortly before the CHO might be wrongly interpreted and categorized as 'almost too late' execution, even though the CHO execution occurred under stable radio link conditions of the serving cell.

The current standard does not provide a distinction between the examples of FIGS. 2 and 3. Put another way, there is no distinction between the situations in which i) a temporary deterioration in the serving radio signal occurs before a transfer is executed (e.g. due to shadowing/interference) and ii) the signal quality deteriorates and does not recover before execution of the transfer.

Various implementations of the technology described herein may address this problem. As described above, implementations of the technology described herein relate to establishing a radio communications link between the terminal device and a serving cell of a telecommunications network; executing a transfer of the radio communications link from the serving cell to a target cell of the telecommunications network; detecting that a timer, expiry of which causes declaration of a radio link failure with the serving cell, has reached a threshold value but has been stopped prior to expiry and prior to execution of the transfer; and after successful execution of the transfer, controlling the transmission or the content of a transfer report. For instance, this may prevent information included in the transfer report (e.g. information indicative of measurements relating to the transfer) from being used for adjusting transfer parameters for use in determining inter-cell transfers within the telecommunications network.

In some examples, the content of the transfer report may be controlled such that a terminal device transmits a transfer report including (i) information indicative of measurements relating to a transfer, from a source telecommunications network cell to a target telecommunication network cell, of a radio communications link involving the terminal device, and (ii) an indication that a timer, expiry of which causes declaration of a radio link failure with the serving cell, has reached a threshold value but has been stopped prior to expiry and prior to execution of the transfer. In this way, the terminal device may indicate to the network that the information indicative of the measurements is not to be used for adjusting transfer parameters for use in determining inter-cell transfers within the telecommunications network.

Whilst the information indicative of measurements relating to the transfer is not used for adjusting transfer parameters, in some such examples this information may instead be beneficially utilised by other use cases within a self-organising network (SON). For instance, the information relating to the transfer may also be used in performance of Coverage and Capacity Optimisation (CCO). Put another way, whilst the information would not be usable for MRO, it may provide the network with information about radio link degradation caused by factors other than misconfiguration of the transfer parameters (e.g. caused by shadowing or interference) which could be used for improving other aspects of the network configuration. For instance, this approach may enable coverage hole issues to be identified during the evaluation phase and resolved.

Further aspects of this approach are described with reference to S4.6$a$ in FIG. 4 and FIG. 5 below.

In other examples, such as those in which the information is not required to be used with other SON use cases, preparation of a transfer report for transmission may be initiated, the transfer report including information indicative of measurements relating to a transfer, from a source telecommunications network cell to a target telecommunication network cell, of a radio communications link involving the terminal device. However, the terminal device may control transmission of the report such that it subsequently refrains from transmitting the transfer report, thereby preventing the information indicative of the measurements from being used for adjusting transfer parameters for use in determining inter-cell transfers within the telecommunications network.

In general terms, this solution may be described as an enhancement of the trigger criterion to prevent a transfer report from being sent when the information included in the transfer report (e.g. information indicative of measurements relating to the transfer) is not suitable for adjusting the transfer parameters. Whilst this approach is simpler, the information included in the transfer report may not be leveraged for use in supporting other SON functionality.

Further aspects of this approach are described with reference to S4.6*b* in FIG. 4 and FIG. 6 below.

Nonetheless, both solutions enable the network to avoid misinterpretation of transfers as occurring ‘almost too late’. Put another way, both approaches avoid information included in a transfer report (e.g. SHR, SPR) being used in such a way as to cause improper adjustment of transfer parameters in the network. As such, various implementations of the technology described herein may reduce RLFs and unnecessary inter-cell transfers in telecommunications networks.

Figure 4:
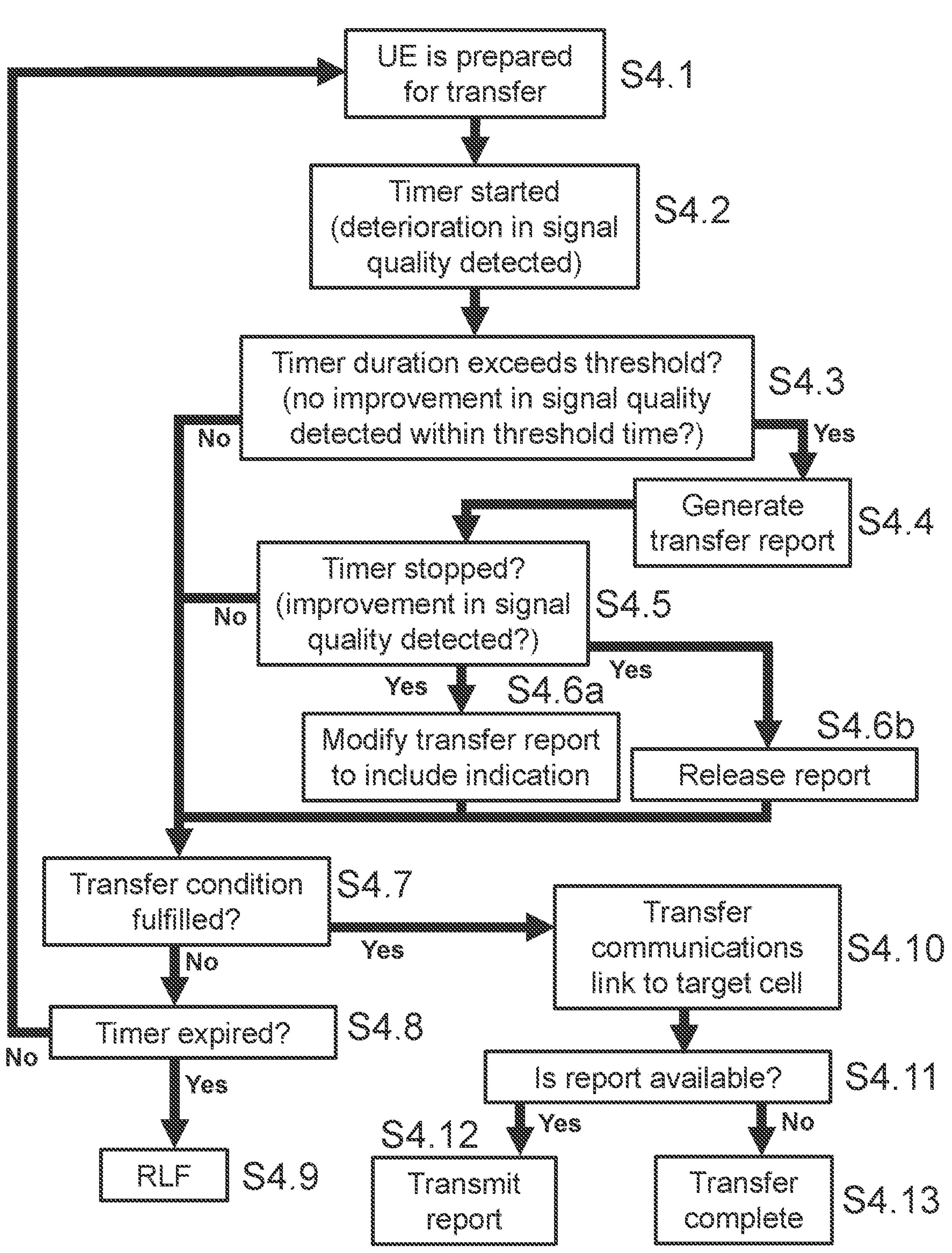
FIG. 4 is a flowchart illustrating various operations which may be performed in accordance with examples described herein.

FIG. 4 is a flowchart depicting various operations which may be performed in accordance with various examples. For instance, the operations depicted in FIG. 4 may be executed by a terminal device or other suitable apparatus.

In general terms, the operations depicted in FIG. 4 relate to controlling the transmission or the content of a transfer report (e.g. a message included in a signal) based on a detection that a timer, expiry of which causes declaration of a radio link failure with the serving cell, has reached a threshold value but has been stopped prior to expiry and prior to execution of the transfer, as described above. In particular, various aspects of FIG. 4 relate to report handling in the situation in which a deterioration in signal quality is detected after the terminal device has been configured for a conditional transfer (e.g. CHO, CPC).

It will be appreciated that various entities referred to in the foregoing description of FIG. 4 may correspond to entities described with reference to the other FIGS. For instance, the method of FIG. 4 may be implemented by terminal device 100 in communications with base stations 110 and 120.

Prior to operation S4.1, a radio communications link may be established between the terminal device and a serving cell of a telecommunications network. In the foregoing discussion, the serving cell is referred to as the ‘source cell’. In some examples, the terminal device may use a contention based random access (CBRA) or contention free random access (CFRA) procedure for establishing a connection with the source cell.

In operation S4.1, the terminal device is configured for transfer of a radio communications link from a source cell to a target cell. In some examples, the terminal device may be configured using configuration information received from the source cell via the radio communications link (e.g. as part of a RRCReconfiguration message). In some examples, the configuration information may be indicative of at least one condition, with the radio communications link being transferred from the source telecommunications network cell to the target telecommunications network cell responsive to the at least one condition being fulfilled. Various types of transfer condition will be apparent to the skilled person. For instance, one such transfer condition could comprise a signal quality or strength of the target cell as measured at the terminal device passing a threshold, or staying above or below such a threshold for a predetermined period of time. Another transfer condition could comprise the target cell being offset better than the serving cell. Yet another transfer condition could comprise a signal quality or signal strength of the target cell as measured at the terminal device passing a threshold in combination with a signal quality or strength of the serving cell as measured at the terminal device passing below another threshold. It will be appreciated that, different thresholds, transfer conditions and/or combinations of transfer conditions may be used for different target cells. Various aspects relating to conditional reconfiguration evaluation are described in 3GPP TS 38.3315.3.5.13.4.

Put another way, having received the configuration information including at least one transfer condition (sometimes referred to as an ‘execution condition’), the terminal device may enter an ‘evaluation phase’ in which the at least one transfer condition is evaluated. For instance, the transfer condition may be monitored continually, or checked at regular intervals (e.g. every 1 ms). When the at least one transfer condition is determined to be fulfilled, the transfer of the radio communications link may be executed.

Put yet another way, the terminal device may be preconfigured to autonomously trigger execution of the transfer based on configuration information received from the serving cell via the radio communications link. For instance, the configuration information may be indicative of at least one condition, execution of the transfer is autonomously triggered responsive to the at least one condition being fulfilled.

In some examples, the configuration information may include transfer conditions (e.g. signal strength/quality conditions as described above) relating to each of a plurality of candidate cells. For instance, a first candidate cell may be associated with a first transfer condition, whilst a second candidate cell may be associated with a second transfer condition. In some such examples, each of the transfer conditions may be considered during the evaluation phase, with the candidate cell corresponding to the first transfer condition to be satisfied becoming the target cell to which the radio communications link is transferred.

In some examples, responsive to receiving configuration information from the source cell, the terminal device may transmit an acknowledgement (e.g. an RRCReconfigurationComplete message) of this information to the source cell.

In operation S4.2, a deterioration in signal quality of the radio communications link between the terminal device and the source cell is detected. In some examples, compilation of measurements relating to the radio communications link is initiated based on a detection of the deterioration.

In operation S4.3, it is determined whether a threshold period of time has elapsed from the detection of the deterioration in signal quality without detection of an improvement in signal quality. If the threshold period of time elapses without detection of an improvement in signal quality, the method proceeds to operation S4.4, otherwise the method proceeds to operation S4.7. In some examples, the method instead proceeds straight to operation S4.4 responsive to detection of the deterioration in signal quality at S4.2.

In operation S4.4, prior to a detection of an improvement in signal quality, a transfer report is generated at the terminal device. In some examples, the transfer report may comprise a message including information indicative of measurements relating to a transfer, from a source telecommunications network cell to a target telecommunication network cell, of a radio communications link involving the terminal device.

In some examples, rather than generating a transfer report/message including the measurements, operation 4.4 may comprise compiling the measurements relating to the radio communications link. Such compiled measurements may later be incorporated into a generated transfer report (e.g. at operation S4.6*a*).

In some examples, the measurements relating to the transfer of the radio communications link may be performed by the terminal device during a time interval between a configuration of the terminal device for the transfer of the radio communications link and an execution of the transfer of the radio communications link. That is to say, in some examples, the measurements relating to the transfer may be performed during the evaluation phase of the transfer.

In addition or alternatively, the measurements relating to the transfer of the radio communications link may comprise at least one of: measurements of signals received at the terminal device from the source telecommunications network cell; measurements of signals received at the terminal device from the target telecommunications network cell; or measurements of signals received at the terminal device from a neighbouring telecommunications network cell. It will be appreciated that such measurements may comprise strength or quality measurements of a variety of types (e.g. SINR, SNR, RSSI, RSRQ) and may be suitable for use in SON use cases such as MRO and CCO.

In operation S4.5, if an improvement in signal quality of the radio communications link between the terminal device and the source telecommunications network cell is detected (e.g. as depicted in FIG. 3), the method proceeds to operation S4.6*a* or S4.6*b*. Otherwise (e.g. as depicted in FIG. 2), the method proceeds to operation S4.7. In some examples, operation S4.5 may be incorporated into section 5.7.10.6 of TS 38.311.

Put another way, operation S4.2 may correspond to a timer (e.g. but not limited to, a T310 timer), expiry of which causes declaration of a radio link failure with the serving cell, being started. In some examples, the timer may be triggered responsive to the detection of a deterioration in signal quality of the radio communications link between the terminal device and the source cell. As described above, the deterioration in signal quality may comprise a signal quality metric for the radio communications link between the terminal device and the source telecommunications network cell falling below a quality deterioration threshold, $Q_{out}$. In some examples, the quality deterioration threshold may correspond to the quality level at which the downlink radio link cannot be reliably received. For instance, this may correspond to an out-of-sync block error rate (BLERout) of 10%, as specified in TS 38.133 Section 8.1.

In other examples, the timer may be triggered responsive to receiving a predetermined number (e.g. one) out-of-sync or early out-of-sync indicators from lower layers in the network or responsive to detection of physical layer problems for the source cell.

In this context, operation S4.3 may correspond to the timer exceeding a predetermined threshold duration. For instance, if the timer is set to expire after a fixed amount of time (e.g. 1000 ms) (at which time an RLF is declared), the predetermined threshold duration may correspond to a predetermined percentage of the total length of the timer (e.g. 40%) elapsing. If the timer crosses this threshold duration, the method proceeds to operation S4.4, otherwise the method proceeds to operation S4.7.

Similarly, operation S4.5 may correspond to the timer stopping prior to expiry. In some examples, the timer may be configured to stop responsive to detection of an improvement in signal quality of the radio communications link. As described above, the improvement in signal quality of the radio communications link between the terminal device and the source telecommunications network cell may comprise a signal quality metric for the radio communications link between the terminal device and the source telecommunications network cell meeting or exceeding a quality improvement threshold, $Q_{in}$. In some examples, the quality improvement threshold may correspond to the quality level at which the downlink radio link quality can be received with significantly higher reliability than at the quality deterioration threshold. For instance, this may correspond to an out-of-sync block error rate (BLERout) of 2%, as specified in TS 38.133 Section 8.1. If the timer stops before the transfer of the radio communications link has been executed (e.g. during the 'evaluation phase' before any transfer condition is fulfilled), then the method proceeds to operation S4.6*a* or S4.6*b*. Otherwise the method proceeds to S4.7. In some examples, the quality improvement threshold $Q_{in}$ is greater than or equal to the quality deterioration threshold $Q_{out}$.

In general terms, the values $Q_{in}$ and $Q_{out}$ (which are depicted on the axes of both FIGS. 2 and 3) may be considered to be values of a signal quality metric for the serving cell radio link that trigger and stop the timer respectively.

In operation S4.6*a*, the transfer report is modified to include an indication that the timer has reached a threshold value but has been stopped prior to expiry and prior to execution of the transfer. In addition or alternatively, the transfer report may include an indication that the information indicative of the measurements is not to be used for adjusting transfer parameters for use in determining inter-cell transfers within the telecommunications network. In some such examples, the transfer report may have been generated prior to the detection of the improvement in signal quality of the radio communications link at operation S4.5. Alternatively, rather than modifying a generated transfer report, a transfer report for transmission may be generated at S4.6*a* including both the measurements compiled at S4.4 and the indication.

In some examples, the indication may comprise an information element, IE. For instance, the IE may express that timer T310 was stopped after passing the thresholdPercentageT310 criterion (e.g. 40% of timer total duration). Alternatively, the IE may express that timer T310 was running when the transfer condition is met or when the transfer is executed.

In some examples, the transfer report (as generated or modified in operation S4.6*a*) may further include information as to whether temporary deteriorations (i.e. without expiry of the timer) in signal quality (sometimes referred to as 'outages') occurred multiple times before the transfer was successfully executed. For instance, the indication included in the transfer report could be extended to include the number of outages detected before returning to stable radio conditions in which the transfer of the radio communications link is successfully executed. Whilst the occurrence of multiple outages in the evaluation phase is unlikely, timing information relating to such outages (if they occur) may be beneficially leveraged by the network for various SON use cases.

In some examples, the transfer report (as generated or modified in operation S4.6*a*) may further include outage timing information for at least one temporary deterioration in signal quality of the radio communications link between the terminal device and the source telecommunications target cell. For instance, the outage timing information for the at least one temporary deterioration in signal quality may comprise a time interval between (i) a configuration of the terminal device for the transfer of the radio communications link and (ii) a starting of the timer. In addition or alternatively, the outage timing information may comprise a time interval between (i) a starting of the timer and (ii) a stopping of the timer. In addition or alternatively, the outage timing information may comprise a time interval between (i) a stopping of the timer and (ii) the execution of the transfer of the radio communications link. In addition or alternatively, the outage timing information may comprise a time interval between (i) a starting of the timer and (ii) the execution of the transfer of the radio communications link.

Put another way, the outage timing information for the at least one temporary deterioration in signal quality may comprise a time interval between a configuration of the terminal device for the transfer of the radio communications link (e.g. when the start of the evaluation phase) and a detected start of the at least one temporary deterioration in signal quality (e.g. when the signal quality metric drops below $Q_{out}$). In addition or alternatively, the outage timing information may comprise a detected duration of the at least one temporary deterioration in signal quality (e.g. the interval between the signal quality metric dropping below $Q_{out}$ and returning to $Q_{in}$). In addition or alternatively, the outage timing information may comprise a time interval between a detected end of the at least one temporary deterioration in signal quality (e.g. when the signal quality metric drops returns to $Q_{in}$) and an execution of the transfer of the radio communications link (e.g. when a transfer condition is fulfilled).

In some examples, the outage timing information for the at least one temporary deterioration in signal quality may comprise a time interval between (i) a configuration of the terminal device for the transfer of the radio communications link and (ii) a first starting of the timer. In addition or alternatively, the outage timing information for the at least one temporary deterioration in signal quality may comprise a time interval between (i) a last stopping of the timer and (ii) the execution of the transfer of the radio communications link. In addition or alternatively, the outage timing information for the at least one temporary deterioration in signal quality may comprise a time interval between (i) a last starting of the timer and (ii) the execution of the transfer of the radio communications link.

Put another way, the outage timing information for the at least one temporary deterioration in signal quality may comprise a time interval between a configuration of the terminal device for the transfer of the radio communications link and a detected earliest start of the at least one temporary deterioration in signal quality. In addition or alternatively, the outage timing information for the at least one temporary deterioration in signal quality may comprise a time interval between a detected most recent end of the at least one temporary deterioration in signal quality and an execution of the transfer of the radio communications link.

In some examples, the outage timing information for the at least one temporary deterioration in signal quality may comprise a number of the at least one temporary deterioration in signal quality (i.e. how many times the timer was started and then stopped).

Put another way, timing information may be included in the transfer report for better localisation of outages before the execution of the transfer. In case of such temporary outages which each end with an 'in-sync event' (i.e. an improvement in signal quality or when the timer stops), the following information could be logged for potential inclusion in the transfer report:

a) a list of temporary outages including information about following time intervals per outage:
   - a time between transfer preparation (i.e. the start of the evaluation phase) and the triggering of the timer,
   - a duration of the outage (i.e. the time elapsed between the timer starting and stopping), and
   - a time between the timer stopping and the execution of the transfer; and/or b) a number of temporary outages between transfer preparation and execution together with:
   - a time between transfer preparation and the start of the first outage (i.e. when the timer is first triggered), and
   - a time between the end of the last outage (i.e. when the timer is last stopped) and execution of the transfer.

It will be appreciated that less memory (e.g. at the terminal device) may be required to hold the information described in case b), and further that, in the situation where the number of outages is one, the first outage is the same as the last outage.

In operation S4.6*b*, which may be performed instead of operation S4.6*a*, the transfer report is deleted or 'released'. As described above, rather than controlling the content of the transfer report so as to include an indication that the timer was stopped prior to expiry of the timer and prior to execution of the transfer (e.g. so that information included in the transfer report is not used for adjusting transfer parameters for use in determining inter-cell transfers within the telecommunications network), in this approach the terminal device instead refrains from transmitting the transfer report. In some examples, the transfer report (or measurements used to generate the transfer report) may be held at the terminal device for a period of time before release, rather than being discarded immediately.

In operation S4.7, it is determined whether the at least one transfer condition is fulfilled. As described above, such transfer conditions may, in some examples, correspond to multiple candidate cells. Responsive to the condition being fulfilled, the method proceeds to operation S4.8. Otherwise, the method proceeds to operation S4.8.

In operation S4.8, if the deterioration in signal quality of the radio communications link is not followed by an improvement within a predetermined period of time, the method proceeds to operation S4.9 in which radio link failure (RLF) procedures are followed (e.g. initiating a connection reestablishment procedure with the source cell). Otherwise, the method returns to operation S4.1 to continue the evaluation phase.

Put another way, if the timer has expired, the method proceeds to operation S4.9 in which a RLF with the serving cell is declared. Otherwise, the method returns to operation S4.1.

In operation S4.10, responsive to the fulfilment of the transfer condition at operation S4.7, the radio communications link involving the terminal device is transferred from the source cell to the target cell (i.e. the transfer is executed). For instance, the terminal device may detach from the source cell and synchronise with or attach to the target cell. In this way, the RRC handover procedure may be completed. In some examples, prior to synchronising with the target cell, the terminal device may be configured using information relating to the configuration of the target cell (e.g. as described with reference to operation 503 below). In addition or alternatively, the terminal device may use a contention based random access (CBRA) or contention free random access (CFRA) procedure for establishing a connection with the target cell.

In operation S4.11, after successfully executing the transfer, it is determined whether a transfer report (e.g. including information indicative of measurements relating to the transfer) is available at the terminal device. For instance, if either the transfer was executed without the terminal device returning to stable radio conditions or the terminal device returned to stable link conditions and operation S4.6*a* was performed, a transfer report as described above may be stored at the terminal device. On the other hand, if operation S4.6*b* was performed, no such transfer report may be available.

If it is determined that a transfer report is not available, the method proceeds to operation S4.13 where the method terminates.

If it is determined that a transfer report is available, the method proceeds to operation S4.12, in which the transfer report is transmitted to the network. For instance, the transfer report may be transmitted to the network node operating the target cell (or target node) which, as a result of the transfer, is now the serving cell of the terminal device.

Put another way, the procedure of providing the information included in the transfer report to the network may be similar to the RLF reporting procedure used for MRO. For instance, the availability of a transfer report at the terminal device may be indicated using an RRCReconfigurationComplete message which is sent to the target NG-RAN node (i.e. the new serving node), which completes the handover procedure. This node may fetch the transfer report via the UE Information Request/Response mechanism and forward it to the network node operating the source cell (or source node). In this way, information regarding issues and outages experienced during a successful handover may be shared throughout the network, FIG. 5 is a message flow sequence, indicated generally by the reference numeral 5, in accordance with some aspects of the described technology. The message flow sequence 5 shows an example implementation within which aspects of a process, such as that described with reference to FIGS. 1 to 4, may be performed. In this example, a terminal device 100 is shown in communication with base station 110 and base station 120. By way of example only, base stations 110 and 120 are depicted as gNBs in FIGS. 5 and 6. Base station 110 corresponds to the source telecommunications network cell, and may be referred to as 'source gNB 110', and base station 120 corresponds to the target telecommunications network cell, and may be referred to as 'target gNB 120'.

In operation 501, terminal device transmits a report including information indicative of measurements performed by terminal device 100 to the source gNB 110. In some examples, the measurements may comprise signal strength or quality measurements (e.g. RSRP, RSRP, SINR) for the target cell. In addition or alternatively, the measurements may comprise signal strength or quality measurements for the source cell, or a comparison of signal strength or quality between the target cell and the source cell. Put another way, the measurements included in the report may be indicative of whether the terminal device is approaching the target cell and that a change of cell (i.e. a transfer from the source cell to the target cell) will be required soon.

In operation 502, the telecommunications network prepares to transfer a radio communications link of the terminal device from the source gNB 110 to the target gNB 120. In some examples, the decision to transfer the radio communications link may take place at source gNB 110. For instance, this decision may be based on the results of the measurements included in the report at operation 501. In some examples, the source gNB 110 may use the measurements included in the report to identify that the terminal device is approaching the target cell and/or is leaving the source cell.

In some examples, having determined to perform a radio communications link transfer, source gNB 110 transmits a transfer request (e.g. a CHO request) to one or more candidate gNBs. The candidate gNBs may include target gNB 120 along with other potential target gNBs. In some examples, when a transfer request is received at a gNB, the gNB may transmit an acknowledgement to the source gNB 110. Such an acknowledgement may indicate that the candidate gNB is suitable for sustaining the radio communications link involving terminal device 100.

In some examples, the acknowledgement may include information indicative of a configuration (e.g. capabilities, capacity, location) of the candidate gNB which transmitted the acknowledgement. In some examples, the acknowledgement may not be sent if the candidate gNB determines that transfer of the radio communications link is not feasible or appropriate (e.g. using an admission control procedure). For instance, the candidate gNB may determine not to send an acknowledgement when an expected future capacity of the candidate gNB is insufficient to accommodate the radio communications link involving terminal device 100. Alternatively, rather than determining not to send an acknowledgement, in such examples the candidate gNB may send a negative acknowledgement.

In some examples, operation 502 may further comprise generating configuration information for use by the terminal device in transferring the radio communications link from source gNB 110 to target gNB 120. In addition or alternatively, the configuration information may be generated by another network entity.

In operation 503, configuration information is transmitted by source gNB 110 to terminal device 100. As described above, the configuration information may be generated by the source gNB 110 at operation 502. As described with reference to the previous FIGS., the configuration information may be indicative of at least one condition, with the radio communications link being transferred from source gNB 110 to target gNB 120 responsive to the at least one condition being fulfilled. Put another way, the terminal device may be configured to autonomously trigger execution of the transfer responsive to the at least one condition being fulfilled. In other examples, transfer conditions may be pre-configured at terminal device 100 or received from the network by other means. In addition or alternatively, the configuration information may include information indicative of the configuration of one or more of the candidate cells. In some examples, the configuration information may be transmitted by source gNB 110 to terminal device 100 as part as a RRCReconfiguration message.

In some examples, configuration information may further be transmitted by source gNB 110 to the candidate gNBs (e.g. target gNB 120) for use in performing the transfer. For instance, source gNB may provide the candidate gNBs with a configuration of terminal device 100 and/or the transfer conditions under which the terminal device is to perform the transfer.

In operation 504, terminal device 100 enters the 'evaluation phase' as described above. In some examples, this phase may comprise maintaining the connection with source gNB 110 whilst evaluating the transfer conditions included in the configuration information.

In operation 505, a timer (e.g. a T310 timer) is started, expiry of which causes declaration of a radio link failure with the serving cell. As described above, this may occur responsive to terminal device 100 detecting a deterioration in a signal quality of the radio communications link between terminal device 100 and gNB 110. In some examples, the timer being started may cause compilation of measurements relating to the radio communications link to be initiated at terminal device 100. In other examples, the compilation may be initiated at operation 506.

In operation 506, the timer reaches a threshold value. Put another way, a threshold period of time elapses from detection of the deterioration in signal quality without detecting an improvement in signal quality. As mentioned above, in some examples, compilation of measurements relating to the radio communications link may be initiated responsive to this threshold period of time elapsing. In some examples, a transfer report including information indicative of these measurements may occur subsequent to the compilation. In a CHO context, operation 506 may comprise the terminal device initiating compilation of the SHR.

In operation 507, the timer is stopped. For instance, this may correspond to an improvement in signal quality being detected. Responsive to this, in operation 508 a transfer report (e.g. as generated at operation 506) is modified to include an indication that the timer has reached a threshold value but has been stopped prior to expiry and prior to execution of the transfer. In operation 508 the transfer report may be generated based on the measurements and the indication.

In operation 509, the transfer condition is met, marking the end of the evaluation phase which began at operation 504. In examples in which terminal device 100 evaluates transfer conditions associated with multiple candidate cells, the evaluation phase may end when a transfer condition associated with at least one candidate cell is fulfilled. In examples in which terminal device 100 evaluates multiple transfer conditions for a given target cell, the evaluation phase may end when one, all or a majority of the transfer conditions are fulfilled.

In operation 510, responsive to the transfer condition being fulfilled, terminal device 100 is configured to transfer the radio communications link from source gNB 110 to target gNB 120 (i.e. execute the transfer).

In operation 511, the transfer report is transmitted by terminal device 100 to target gNB 120.

In operation 512, the transfer report is forwarded by the target gNB 120 (which operates now the new serving cell of terminal device 100) to the source gNB 110.

As described above, in some examples, the information contained in the transfer report may be used by the network for performance of various SON use cases, such as CCO, thereby to improve the reliability of the network.

Figures 5, 6:
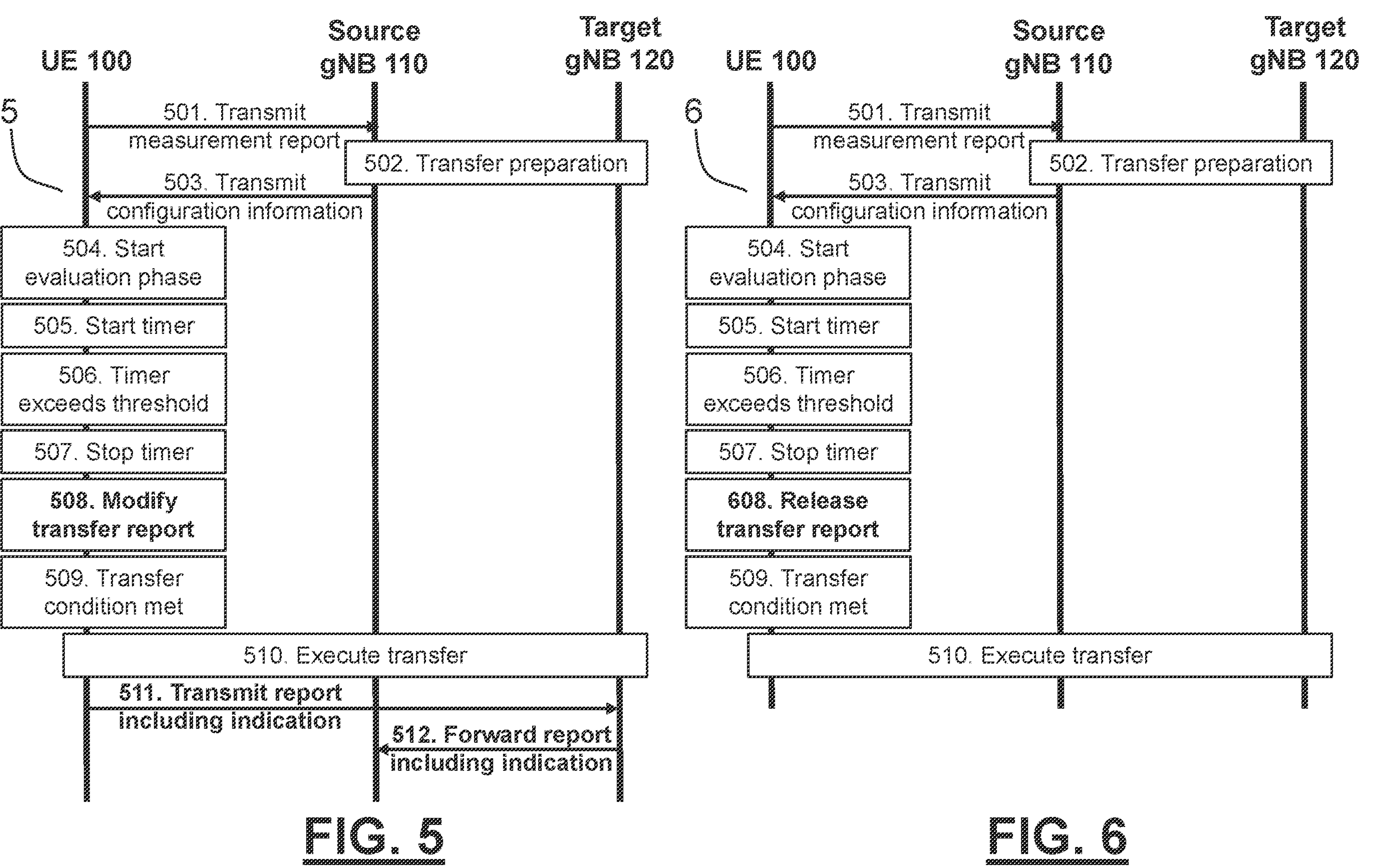
FIGS. 5 and 6 are example message flow sequences.

FIG. 6 is a message flow sequence, indicated generally by the reference numeral 6, in accordance with some aspects of the described technology. The message flow sequence 6 shows an example implementation within which aspects of a process, such as that described with reference to FIGS. 1 to 4, may be performed.

In general terms, the message flow sequence of FIG. 6 relates to the situation in which the terminal device initiates preparation of a transfer report for transmission but subsequently refrains from transmitting the transfer report, as described above with reference to operation S4.6*b* of FIG. 4. As such, it will be appreciated that various operations performed within the message flow sequence of FIG. 6 are also performed in the message flow sequence of FIG. 5. In particular, operations 501 to 507 and 509 to 510 described above with reference to FIG. 5 are also performed in the message flow sequence of FIG. 6, whilst operations 508, 511 and 512 are omitted. These operations are discussed in more detail above, with such discussion not being repeated here. For clarity, operations which are not common to the two message flow sequences are shown in bold.

In operation 608, which replaces operation 508 and is subsequent to the detection in operation 507, the compiled measurements and/or generated transfer report are deleted or released by terminal device 100. In this way, terminal device 100 may refrain from transmitting the transfer report to the network such that information included in the transfer report is not used for adjusting transfer parameters for use in determining inter-cell transfers within the telecommunications network. Put another way, the terminal device may control transmission of the transfer report such that the information contained therein is not provided to the network.

In some examples, rather than deleting a generated transfer report, the terminal device may instead elect in operation 608 not to generate the transfer report based on previously compiled measurements. In some examples, whilst the transfer report may be discarded (or not generated), the terminal device may retain some or all of any measurements compiled for inclusion in the transfer report for other purposes.

It will be appreciated that various operations and entities described with reference to FIGS. 5 and 6 may correspond to operations and entities described with reference to the preceding FIGS., in particular FIG. 4. For instance, operations 502 to 504 may correspond to operation S4.1, operation 505 may correspond to S4.2, operation 506 may correspond to S4.4, operation 507 may correspond to the 'Yes' branch of operation S4.5, operation 508 may correspond to operation S4.6*a*, operation 509 may correspond to the 'Yes' branch of operation S4.7, operation 510 may correspond to S4.10, operation 511 may correspond to S4.12 and operation 608 may correspond to S4.6*b*.

It will be further appreciated that various operations described with reference to FIGS. 5 and 6 may be performed by entities other than those expressly depicted. For instance, some or all of the operations attributed to base stations 110 and 120 may be performed by other entities of the cellular telecommunication network, such as core network (CN) entities.

Figure 7:
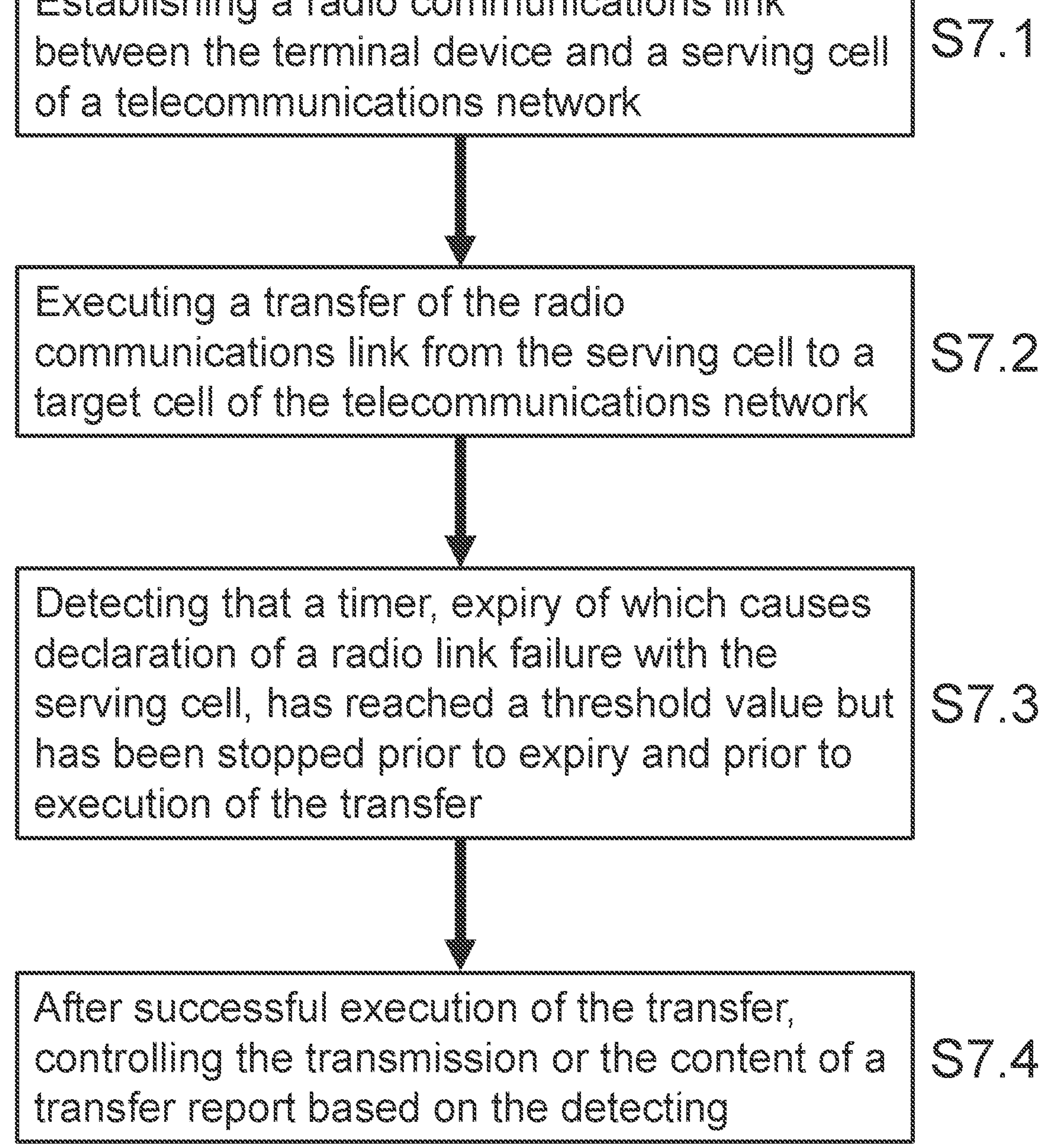
FIG. 7 is a flowchart illustrating various operations which may be performed in accordance with examples described herein.

FIG. 7 is a flowchart depicting various operations which may be performed in accordance with various examples. For instance, the operations depicted in FIG. 7 may be executed by a terminal device or other suitable apparatus.

In operation S7.1, a radio communications link between the terminal device and a serving cell of a telecommunications network is established.

In operation S7.2, a transfer of the radio communications link from the serving cell to a target cell of the telecommunications network is executed.

In operation S7.3, it is detected that a timer, expiry of which causes declaration of a radio link failure with the serving cell, has reached a threshold value but has been stopped prior to expiry and prior to execution of the transfer.

In operation S7.4, after successful execution of the transfer, the transmission or the content of a transfer report is controlled based on the detecting.

These operations are discussed in more detail elsewhere, and such discussion is not repeated here.

As will of course be appreciated, various operations illustrated in FIG. 7 may correspond to operations already described with reference to the preceding FIGS. For instance, operation S7.2 may correspond to operation S4.10 of FIG. 4 or operation 510 of FIGS. 5 and 6. In addition or alternatively, S7.4 may correspond to operation S4.6*a* or S4.6*b* of FIG. 4, operation 508 of FIG. 5 or operation 608 of FIG. 6.

Figure 8:
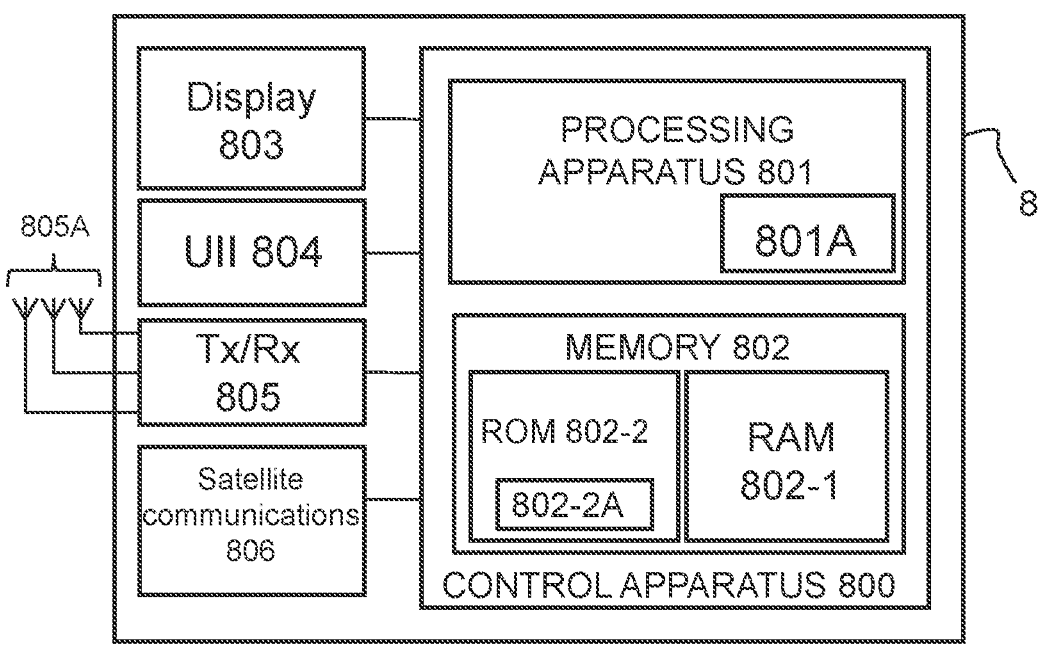
FIG. 8 is a schematic illustration of an example configuration of a terminal device which may be configured to perform various operations described with reference to FIGS. 1 to 7.

FIG. 8 is a schematic illustration of an example configuration of a computing apparatus 8 which may be configured to perform various operations described with reference to FIGS. 1 to 7.

Computing apparatus may comprise control apparatus 800 which is configured to control operation of other components which form part of the computing apparatus 8 thereby to enable performance of various operations described with reference to FIGS. 1 to 7. The computing apparatus 800 may comprise processing apparatus 801 and memory 802. Computer-readable code 802-2A may be stored on the memory 802, which when executed by the processing apparatus 801, causes the control apparatus 800 to perform any of the operations described herein.

In addition, computing apparatus may further include a display 803, user interactive interface (UII) 804, radio frequency interface 805 configured to interface radio frequency signals transmitted and received via a radio frequency antenna array 805A, and global navigation satellite system (GNSS) 806. In some examples, other satellite communications systems may be used instead of or in addition to GNSS 806.

Figure 9:
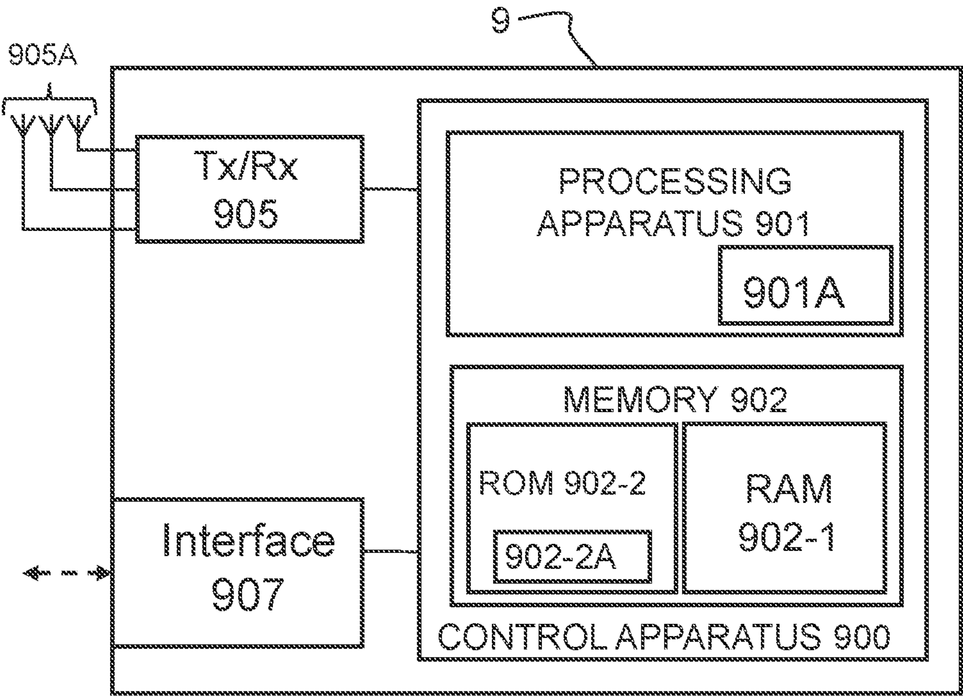
FIG. 9 is a schematic illustration of an example configuration of a radio access node which may be configured to perform various operations described with reference to FIGS. 1 to 7.

FIG. 9 is a schematic illustration of an example configuration of a radio access node or base station 9 which may be configured to perform various operations described with reference to FIGS. 1 to 7.

The base station 9, which may be referred to as a gNB, base station or access point (AP), comprises control apparatus 900 which is configured to control operation of other components which form part of the base station 9 thereby to enable transmission of signals to and receipt of signals from UEs in its coverage area vicinity. For example, the base station control apparatus 900 is configured to cause transmission of reference signals to UEs within its coverage area. Furthermore, in some examples, the control apparatus 900 may be configured to enable receipt of reference signal measurement data and/or location data from the UEs in its coverage area. The control apparatus 900 may also enable communication with other base stations and/or other network nodes. The control apparatus 900 may additionally be configured to cause performance of any other operations described herein with reference to the base station 9.

The base station 9 comprises a radio frequency antenna array 9005 configured to receive and transmit radio frequency signals. Although the base station 9 in FIG. 9 is shown as having an array 905A of three antennas, this is illustrative only. The number of antennas may vary, for instance, from one to many hundreds.

The base station 9 further comprises a radio frequency interface 905 configured to interface the radio frequency signals received and transmitted by the antenna 905A and a control apparatus 90. The radio frequency interface 905 may also be known as a transmitter, receiver and/or transceiver. The base station 9 may also comprise an interface 907 via which, for example, it can communicate with other network elements such as other radio access network entities (such as the other base stations) and/or core network entities.

The base station control apparatus 900 may be configured to process signals from the radio frequency interface 905, to control the radio frequency interface 905 to generate suitable RF signals to communicate information to UEs via the wireless communications link, and also to exchange information with other base stations 9 and core network entities via the interface 907.

The control apparatus 900 may comprise processing apparatus 901 and memory 902. Computer-readable code 902-2A may be stored on the memory 902, which when executed by the processing apparatus 901, causes the control apparatus 900 to perform any of the operations described herein and attributed to the base station 9.

Some further details of components and features of the above-described devices/entities/apparatuses 8, 9 and alternatives for them will now be described.

The control apparatuses described above 800, 900 may comprise processing apparatus 801, 901 communicatively coupled with memory 802, 902. The memory 802, 902 has computer readable instructions 802-2A, 902-2A stored thereon, which when executed by the processing apparatus 801, 901 causes the control apparatus 800, 900 to cause performance of various ones of the operations described with reference to FIGS. 1 to 7. The control apparatus 800, 900 may in some instances be referred to, in general terms, as "apparatus".

The processing apparatus 801, 901 may be of any suitable composition and may include one or more processors 801A, 901A of any suitable type or suitable combination of types. Indeed, the term "processing apparatus" should be understood to encompass computers having differing architectures such as single/multi-processor architectures and sequencers/parallel architectures. For example, the processing apparatus 801, 901 may be a programmable processor that interprets computer program instructions 802-2A, 902-2A and processes data. The processing apparatus 801, 901 may include plural programmable processors. Alternatively, the processing apparatus 801, 901 may be, for example, programmable hardware with embedded firmware. The processing apparatus 801, 901 may alternatively or additionally include one or more specialised circuit such as field programmable gate arrays FPGA, Application Specific Integrated Circuits (ASICs), signal processing devices etc. In some instances, processing apparatus 801, 901 may be referred to as computing apparatus or processing means.

The processing apparatus 801, 901 is coupled to the memory 802, 902 and is operable to read/write data to/from the memory 802, 902. The memory 802, 902 may comprise a single memory unit or a plurality of memory units, upon which the computer readable instructions (or code) 802-2A, 902-2A is stored. For example, the memory 802, 902 may comprise both volatile memory 802-1, 902-1 and non-volatile memory 802-2, 902-2. In such examples, the computer readable instructions/program code 802-2A, 902-2A may be stored in the non-volatile memory 802-2, 902-2 and may be executed by the processing apparatus 801, 901 using the volatile memory 802-1, 902-1 for temporary storage of data or data and instructions. Examples of volatile memory include random-access memory (RAM), dynamic random-access memory (DRAM), and synchronous dynamic random-access memory (SDRAM) etc. Examples of non-volatile memory include read-only memory (ROM), programmable read-only memory (PROM), electronically erasable programmable read-only memory (EEPROM), flash memory, optical storage, magnetic storage, etc.

The memory 802, 902 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

Figure 10:
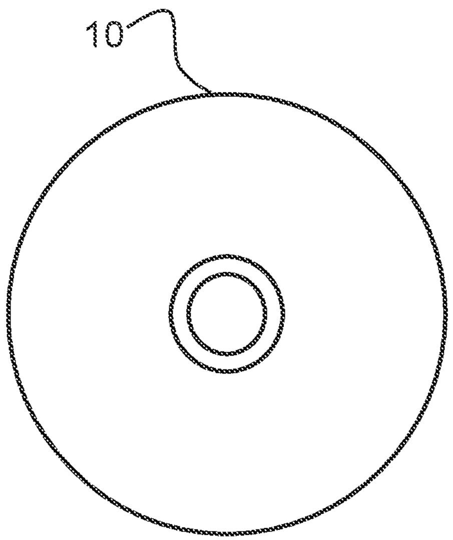
FIG. 10 is an illustration of a computer-readable medium upon which computer readable code may be stored.

The computer readable instructions/program code 802-2A, 902-2A may be pre-programmed into the control apparatus 800, 900. Alternatively, the computer readable instructions 802-2A, 902-2A may arrive at the control apparatus via an electromagnetic carrier signal or may be copied from a physical entity 10 such as a computer program product, a memory device or a record medium such as a compact disc read-only memory (CD-ROM) or digital versatile disc (DVD) an example of which is illustrated in FIG. 10. The computer readable instructions 802-2A, 902-2A may provide the logic and routines that enables the entities devices/apparatuses 8, 9 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4 and 7 are examples only and that various operations depicted therein may be omitted, reordered and/or combined.

Although the methods and apparatuses have been described in connection with an E-UTRA or 5G network, it will be appreciated that they are not limited to such networks and are applicable to radio networks of various different types.

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while various examples are described above, these descriptions should not be viewed in a limiting sense. Rather, there are several variations and modifications which may be made without departing from the scope of the present invention as defined in the appended claims.

The invention claimed is:

1. An apparatus comprising at least one processor and at least one memory storing instructions that, when executed by the at least one processor, cause the apparatus at least to perform:

establishing a radio communications link between the apparatus and a serving cell of a telecommunications network;

executing a transfer of the radio communications link from the serving cell to a target cell of the telecommunications network;

detecting that a timer, expiry of which causes declaration of a radio link failure with the serving cell, has reached a threshold value but has been stopped prior to expiry and prior to execution of the transfer; and after successful execution of the transfer, controlling the transmission or the content of a transfer report based on the detecting, wherein the transfer report includes information indicative of measurements relating to the transfer of the radio communications link from the serving cell to the target cell, wherein the transfer report further includes outage timing information for at least one temporary deterioration in signal quality of the radio communications link between the apparatus and the serving cell, the outage timing information for the at least one temporary deterioration in signal quality comprising:

a time interval between (i) a configuration of the apparatus for the transfer of the radio communications link and (ii) a starting of the timer;

a time interval between (i) a starting of the timer and (ii) a stopping of the timer;

a time interval between (i) a stopping of the timer and (ii) the execution of the transfer of the radio communications link; and a time interval between (i) a starting of the timer and (ii) the execution of the transfer of the radio communications link.

2. The apparatus of claim 1, wherein controlling the content of the transfer report based on the detecting comprises controlling the content of the transfer report to include an indication that the timer was stopped prior to expiry of the timer and prior to execution of the transfer, wherein the transfer report is generated prior to a detection of an improvement in signal quality of the radio communications link between the apparatus and the serving cell, and wherein the transfer report is modified responsive to the detection of the improvement to include the indication that the timer was stopped prior to expiry of the timer and prior to execution of the transfer.

3. The apparatus of claim 1, wherein controlling the transmission of the transfer report based on the detecting comprises refraining from transmitting the transfer report and retaining at least some of the measurements compiled for inclusion in the transfer report for one or more other purposes.

4. The apparatus of claim 1, wherein the timer is started responsive to a detection of a deterioration in signal quality of the radio communications link between the apparatus and the serving cell.

5. The apparatus of claim 4, wherein the deterioration in signal quality of the radio communications link between the apparatus and the serving cell comprises a signal quality metric for the radio communications link between the apparatus and the serving cell falling below a quality deterioration threshold.

6. The apparatus of claim 1, wherein the timer is stopped responsive to a detection of an improvement in signal quality of the radio communications link between the apparatus and the serving cell subsequent to the timer reaching the threshold value.

7. The apparatus of claim 6, wherein the improvement in signal quality of the radio communications link between the apparatus and the serving cell comprises a signal quality metric for the radio communications link between the apparatus and the serving cell meeting or exceeding a quality improvement threshold.

8. The apparatus of claim 1, wherein compilation of the measurements is initiated at the apparatus responsive to the timer reaching the threshold value.

9. The apparatus of claim 1, wherein the measurements relating to the transfer of the radio communications link are performed by the apparatus during a time interval between (i) a configuration of the apparatus for the transfer of the radio communications link and (ii) an execution of the transfer of the radio communications link.

10. The apparatus of claim 1, wherein the measurements relating to the transfer of the radio communications link comprise:

measurements of signals received at the apparatus from the serving cell;

measurements of signals received at the apparatus from the target cell; and measurements of signals received at the apparatus from a neighbouring cell of the telecommunication network.

11. The apparatus of claim 1, wherein the outage timing information for the at least one temporary deterioration in signal quality comprises:

a number of the at least one temporary deterioration in signal quality;

a time interval between (i) a configuration of the apparatus for the transfer of the radio communications link and (ii) a first starting of the timer;

a time interval between (i) a last stopping of the timer and (ii) the execution of the transfer of the radio communications link; and a time interval between (i) a last starting of the timer and (ii) the execution of the transfer of the radio communications link.

12. The apparatus of claim 1, wherein the apparatus is preconfigured to autonomously trigger execution of the transfer based on configuration information received from the serving cell via the radio communications link.

13. The apparatus of claim 12, wherein the configuration information is indicative of at least one condition, and wherein the transfer is executed responsive to the at least one condition being fulfilled.

14. The apparatus of claim 1, wherein the threshold value comprises a predetermined percentage of a total duration of the timer before expiry.

15. The apparatus of claim 1, wherein the transfer report further includes an indication that information indicative of the measurements is not to be used for adjusting transfer parameters for use in determining inter-cell transfers within the telecommunications network, wherein the information indicative of the measurements is used for coverage and capacity optimization of the telecommunications network.

16. The apparatus of claim 1, wherein:

compilation of the measurements is initiated at the apparatus responsive to the timer reaching the threshold value;

the measurements relating to the transfer of the radio communications link comprise measurements of signals received at the apparatus from the serving cell, measurements of signals received at the apparatus from the target cell, and measurements of signals received at the apparatus from a neighbouring cell of the telecommunication network;

the transfer report further includes an indication that information indicative of the measurements is not to be used for adjusting transfer parameters for use in determining inter-cell transfers within the telecommunications network; and the outage timing information for the at least one temporary deterioration in signal quality further comprises a number of the at least one temporary deterioration in signal quality, a time interval between (i) a configuration of the apparatus for the transfer of the radio communications link and (ii) a first starting of the timer, a time interval between (i) a last stopping of the timer and (ii) the execution of the transfer of the radio communications link, and a time interval between (i) a last starting of the timer and (ii) the execution of the transfer of the radio communications link.

17. A method comprising:

establishing a radio communications link between a terminal device and a serving cell of a telecommunications network;

executing a transfer of the radio communications link from the serving cell to a target cell of the telecommunications network;

detecting that a timer, expiry of which causes declaration of a radio link failure with the serving cell, has reached a threshold value but has been stopped prior to expiry and prior to execution of the transfer; and after successful execution of the transfer, controlling the transmission or the content of a transfer report based on the detecting, wherein the transfer report includes information indicative of measurements relating to the transfer of the radio communications link from the serving cell to the target cell, wherein the transfer report further includes outage timing information for at least one temporary deterioration in signal quality of the radio communications link between the apparatus and the serving cell, the outage timing information for the at least one temporary deterioration in signal quality comprising:

a time interval between (i) a configuration of the apparatus for the transfer of the radio communications link and (ii) a starting of the timer;

a time interval between (i) a starting of the timer and (ii) a stopping of the timer;

a time interval between (i) a stopping of the timer and (ii) the execution of the transfer of the radio communications link; and a time interval between (i) a starting of the timer and (ii) the execution of the transfer of the radio communications link.

18. The method of claim 17, wherein controlling the content of the transfer report based on the detecting comprises controlling the content of the transfer report to include an indication that the timer was stopped prior to expiry of the timer and prior to execution of the transfer.

19. The method of claim 17, wherein controlling the transmission of the transfer report based on the detecting comprises refraining from transmitting the transfer report.

20. An apparatus comprising at least one processor and at least one memory storing instructions that, when executed by the at least one processor, cause the apparatus at least to perform:

transmitting or receiving a transfer report relating to a transfer, from a serving cell of a telecommunications network to a target cell of the telecommunications network, of a radio communications link involving a terminal device, the transfer report including an indication that a timer, expiry of which causes declaration, by the terminal device, of a radio link failure with the serving cell, has reached a threshold value but has been stopped prior to expiry and prior to execution of the transfer, wherein the transfer report includes information indicative of measurements relating to the transfer of the radio communications link from the serving cell to the target cell, wherein the transfer report further includes outage timing information for at least one temporary deterioration in signal quality of the radio communications link between the terminal device and the serving cell, the outage timing information for the at least one temporary deterioration in signal quality comprising:

a time interval between (i) a configuration of the terminal device for the transfer of the radio communications link and (ii) a starting of the timer;

a time interval between (i) a starting of the timer and (ii) a stopping of the timer;

a time interval between (i) a stopping of the timer and (ii) the execution of the transfer of the radio communications link; and a time interval between (i) a starting of the timer and (ii) the execution of the transfer of the radio communications link.

* * * * *